(12) United States Patent
Castorena Martinez et al.

(10) Patent No.: US 11,604,288 B2
(45) Date of Patent: Mar. 14, 2023

(54) SELF-CORRECTING VEHICLE LOCALIZATION

(71) Applicant: Ford Global Technologies, LLC, Dearborn, MI (US)

(72) Inventors: Juan Enrique Castorena Martinez, Southfield, MI (US); Codrin Cionca, Ann Arbor, MI (US); Linjun Zhang, Canton, MI (US); Lu Xu, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 431 days.

(21) Appl. No.: 16/678,674

(22) Filed: Nov. 8, 2019

(65) Prior Publication Data
US 2021/0141100 A1    May 13, 2021

(51) Int. Cl.
*G01S 19/45* (2010.01)
*G01C 21/28* (2006.01)
(Continued)

(52) U.S. Cl.
CPC .............. *G01S 19/45* (2013.01); *G01C 21/28* (2013.01); *G01S 19/48* (2013.01); *G01S 19/51* (2013.01)

(58) Field of Classification Search
CPC ...................................................... G01S 19/45
See application file for complete search history.

(56) References Cited

U.S. PATENT DOCUMENTS 9,162,682 B2  10/2015  Hohm et al.
9,707,961 B1   7/2017  Halder et al.
(Continued)

FOREIGN PATENT DOCUMENTS

DE    102016221440 A1    5/2018

OTHER PUBLICATIONS

Marcus Obst, et al., "Car-to-Car Communication for Accurate Vehicle Localization—The CoVel Approach", Published in International Multi-Conference on Systems, Signals & Devices in Chemnitz, Germany on Mar. 20-23, 2012, retrieved from URL: https://www.semanticscholar.org/paper/Car-to-Car-communication-for-accurate-vehicle-%E2%80%94-The-Obst-Mattern/4ff2d07346d12df7692b90a30e6e11c8030354e7 (3 pages).

*Primary Examiner* — Jeff A Burke
*Assistant Examiner* — Christopher A Buksa
(74) *Attorney, Agent, or Firm* — Frank A. MacKenzie; Bejin Bieneman PLC

(57) ABSTRACT

A computer is programmed to determine a localization of a first vehicle, including location coordinates and an orientation of the first vehicle, based on first vehicle sensor data, and to wirelessly receive localizations of respective second vehicles, wherein a first vehicle field of view at least partially overlaps respective fields of view of each of the second vehicles. The computer is programmed to determine pair-wise localizations for respective pairs of the first vehicle and one of the second vehicles, wherein each of the pair-wise localizations defines a localization of the first vehicle relative to a global coordinate system based on a (a) relative localization of the first vehicle with reference to the respective second vehicle and (b) a second vehicle localization relative to the global coordinate system, and to determine an adjusted localization for the first vehicle that has a minimized sum of distances to the pair-wise localizations.

18 Claims, 5 Drawing Sheets

(51) Int. Cl.
    *G01S 19/51*    (2010.01)
    *G01S 19/48*    (2010.01)

(56) References Cited

U.S. PATENT DOCUMENTS

2010/0256852 A1* 10/2010 Mudalige ................. G08G 1/22
                                                                               701/24
2018/0154901 A1    6/2018  Hasberg et al.

* cited by examiner

SELF-CORRECTING VEHICLE LOCALIZATION

BACKGROUND

One or more computers can be programmed to monitor and/or control operations of an autonomous vehicle, e.g., as a vehicle travels on a road, based on vehicle location and orientation. A computer may determine a location and/or orientation of the vehicle based on data received from vehicle sensors and/or remote computers, e.g., in other vehicles. However, such data may be prone to error.

DETAILED DESCRIPTION

Introduction

Figure 1:
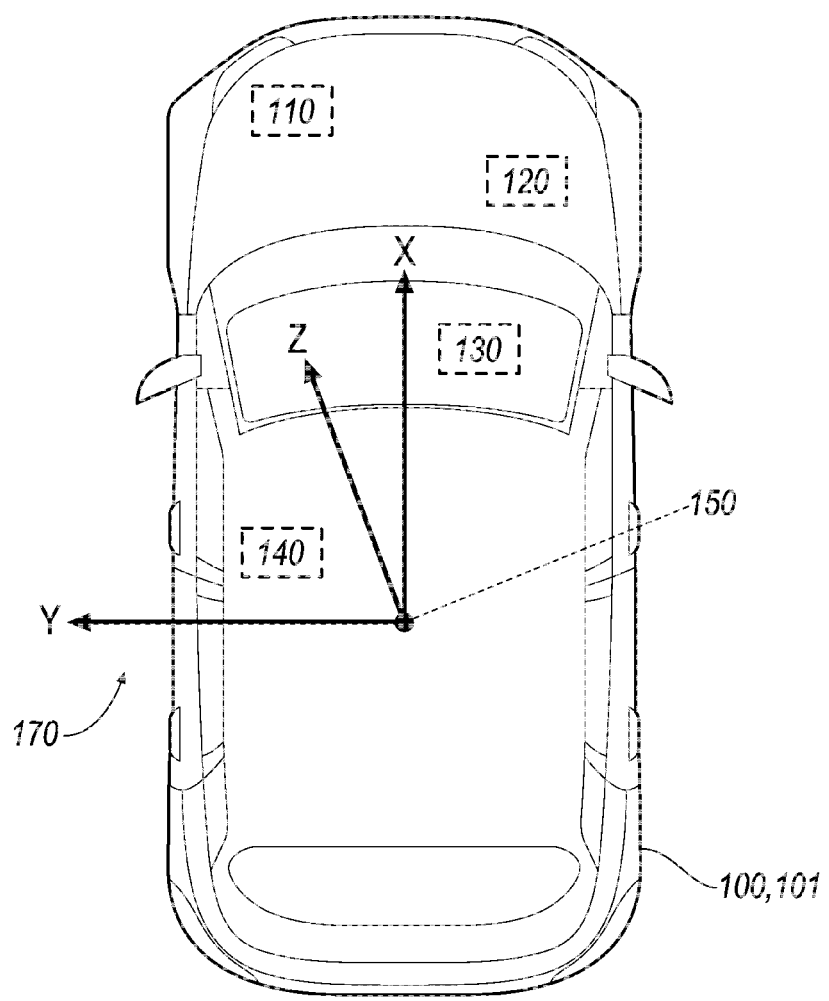
FIG. 1 is a diagram illustrating an example vehicle.

Disclosed herein is a computer comprising a processor and a memory. The memory storing instructions executable by the processor to determine a localization of a first vehicle, including location coordinates and an orientation of the first vehicle, based on first vehicle sensor data, to wirelessly receive localizations of respective second vehicles, wherein a first vehicle field of view at least partially overlaps respective fields of view of each of the second vehicles, to determine pair-wise localizations for respective pairs of the first vehicle and one of the second vehicles, wherein each of the pair-wise localizations defines a localization of the first vehicle relative to a global coordinate system based on a (a) relative localization of the first vehicle with reference to the respective second vehicle and (b) a second vehicle localization relative to the global coordinate system, and to determine an adjusted localization for the first vehicle that has a minimized sum of distances to the pair-wise localizations.

The sensor data may be from one or more of a GPS sensor, LIDAR sensor, camera sensor, or visual odometer.

The second vehicles may include respective second computers, each programmed to determine the localization of the second vehicle based on data received from one or more sensors in the respective second vehicle.

The instructions may further include instructions to compute each of the one or more pair-wise localization for the first vehicle by determining a relative localization of the first vehicle with respect to each respective second vehicle, each relative localization including a relative pose and relative location coordinates with reference to the respective second vehicle based on data received wirelessly from a second vehicle computer, determining the second vehicle localization based on data receive from a sensor in the respective second vehicle, and determining the pair-wise localization of the first vehicle relative to the global coordinate system based on the second vehicle localization and the relative localization of the first vehicle.

The second vehicle localization may include a second vehicle pose with reference to the global coordinate system and a second vehicle location with reference to the global coordinate system.

The instructions may further include instructions to determine a pair-wise pose of the first vehicle based on the relative pose of the first vehicle and the second vehicle pose.

The instructions may further include instructions to compute each of the pair-wise localizations by minimizing distances between representations of the area in an objective function.

The area may be a 3D area including overlapping portion of the fields of view of the first vehicle and the second vehicles.

The adjusted localization of the first vehicle may include an adjusted first vehicle pose and an adjusted first vehicle pose, and the instructions may further include instructions to determine the adjusted first vehicle location by minimizing distances between the pair-wise first vehicle locations, and to determine the adjusted first vehicle pose by minimizing distances between the pair-wise first vehicle poses.

Further disclosed herein is a method, comprising determining a localization of a first vehicle, including location coordinates and an orientation of the first vehicle, based on first vehicle sensor data, wirelessly receiving localizations of respective second vehicles, wherein a first vehicle field of view at least partially overlaps respective fields of view of each of the second vehicles, determining pair-wise localizations for respective pairs of the first vehicle and one of the second vehicles, wherein each of the pair-wise localizations defines a localization of the first vehicle relative to a global coordinate system based on a (a) relative localization of the first vehicle with reference to the respective second vehicle and (b) a second vehicle localization relative to the global coordinate system, and determining an adjusted localization for the first vehicle that has a minimized sum of distances to the pair-wise localizations.

The sensor data may be from one or more of a GPS sensor, LIDAR sensor, camera sensor, or visual odometer.

The method may further include determining, in a second computer in each of the second vehicles, the localization of the second vehicle based on data received from one or more sensors in the respective second vehicle.

Computing each of the one or more pair-wise localization for the first vehicle may further include determining a relative localization of the first vehicle with respect to each respective second vehicle, each relative localization including a relative pose and relative location coordinates with reference to the respective second vehicle based on data received wirelessly from a second vehicle computer, determining the second vehicle localization based on data receive from a sensor in the respective second vehicle, and determining the pair-wise localization of the first vehicle relative to the global coordinate system based on the second vehicle localization and the relative localization of the first vehicle.

The second vehicle localization may include a second vehicle pose with reference to the global coordinate system and a second vehicle location with reference to the global coordinate system.

The method may further include determining a pair-wise pose of the first vehicle based on the relative pose of the first vehicle and the second vehicle pose.

The method may further include computing each of the pair-wise localizations by minimizing distances between representations of the area in an objective function.

The area may be a 3D area including overlapping portion of the fields of view of the first vehicle and the second vehicles.

The method may further include determining an adjusted first vehicle location by minimizing distances between the pair-wise first vehicle locations, wherein the adjusted localization of the first vehicle includes the adjusted first vehicle pose and an adjusted first vehicle pose, and determining the adjusted first vehicle pose by minimizing distances between the pair-wise first vehicle poses.

Further disclosed is a computing device programmed to execute any of the above method steps.

Yet further disclosed is a computer program product, comprising a computer readable medium storing instructions executable by a computer processor, to execute any of the above method steps.

Exemplary System Elements

Vehicle sensors may provide inaccurate vehicle localization. In the present context, a vehicle localization means a vehicle location (i.e., location on the ground) and/or orientation. Herein example systems and methods are disclosed to determine a vehicle localization with improved accuracy. A vehicle computer may determine an adjusted vehicle localization with improved accuracy based on vehicle sensor data and data received from other vehicles communicating with the vehicle computer via a wireless communication network. The computer is programmed to determine a localization of a first vehicle based on first vehicle sensor data, and to wirelessly receive localizations of respective second vehicles. The computer is further programmed to determine pair-wise localizations for respective pairs of the first vehicle and one of the second vehicles, wherein each of the pair-wise localizations defines a localization of the first vehicle relative to a global coordinate system based on a (a) relative localization of the first vehicle with reference to the respective second vehicle and (b) a second vehicle localization relative to the global coordinate system. The computer is further programmed to determine an adjusted localization for the first vehicle that has a minimized sum of distances to the pair-wise localizations.

FIG. 1 illustrates an example vehicle 100, 101. The vehicle 100, 101 may be powered in a variety of known ways, e.g., with an electric motor and/or internal combustion engine. The vehicle 100, 101 may be a land vehicle such as a car, truck, etc. A vehicle 100, 101 may include a computer 110, actuator(s) 120, sensor(s) 130, and a human machine interface (HMI 140). A vehicle 100, 101 has a reference point 150, i.e., a specified point within a space defined by the vehicle body, e.g., a geometrical center point at which respective longitudinal and lateral center axes of the vehicle 100, 101 intersect.

The computer 110 includes a processor and a memory such as are known. The memory includes one or more forms of computer-readable media, and stores instructions executable by the computer 110 for performing various operations, including as disclosed herein.

The computer 110 may operate the vehicle 100, 101 in an autonomous or a semi-autonomous mode. For purposes of this disclosure, an autonomous mode is defined as one in which each of vehicle 100, 101 propulsion, braking, and steering are controlled by the computer 110; in a semi-autonomous mode the computer 110 controls one or two of vehicles 100, 101 propulsion, braking, and steering, and none of these in a non-autonomous or manual mode.

The computer 110 may include programming to operate one or more of land vehicle brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations. Additionally, the computer 110 may be programmed to determine whether and when a human operator is to control such operations.

The computer 110 may include or be communicatively coupled to, e.g., via a vehicle 100, 101 communications bus as described further below, more than one processor, e.g., controllers or the like included in the vehicle for monitoring and/or controlling various vehicle controllers, e.g., a powertrain controller, a brake controller, a steering controller, etc. The computer 110 is generally arranged for communications on a vehicle communication network that can include a bus in the vehicle such as a controller area network (CAN) or the like, and/or other wired and/or wireless mechanisms.

Via the vehicle 100, 101 network, the computer 110 may transmit messages to various devices in the vehicle and/or receive messages from the various devices, e.g., an actuator 120, an HMI 140, etc. Alternatively or additionally, in cases where the computer 110 actually comprises multiple devices, the vehicle 100, 101 communication network may be used for communications between devices represented as the computer 110 in this disclosure. Further, as mentioned below, various controllers and/or sensors may provide data to the computer 110 via the vehicle communication network.

In addition, the computer 110 may be configured for communicating through a wireless vehicular communication interface with other traffic participants (e.g., vehicles, infrastructure, pedestrian, etc.), e.g., via a vehicle-to-vehicle communication network and/or a vehicle-to-infrastructure communication network. The vehicular communication network represents one or more mechanisms by which the computers 110 may communicate with other traffic participants, e.g., a second vehicle 101, and may be one or more of wireless communication mechanisms, including any desired combination of wireless (e.g., cellular, wireless, satellite, microwave and radio frequency) communication mechanisms and any desired network topology (or topologies when multiple communication mechanisms are utilized). Exemplary vehicular communication networks include cellular, Bluetooth, IEEE 802.11, dedicated short range communications (DSRC), and/or wide area networks (WAN), including the Internet, providing data communication services.

The vehicle 100, 101 actuators 120 are implemented via circuits, chips, or other electronic and or mechanical components that can actuate various vehicle subsystems in accordance with appropriate control signals as is known. The actuators 120 may be used to control braking, acceleration, and steering. In one example, the vehicle 100, 101 may include an electronic power steering (EPS) actuator 120 and the computer 110 may be programmed to output a torque command to the EPS actuator 120 to steer the vehicle 100, 101, i.e., steer the vehicle 100, 101 to a right or left direction. The torque command may include a message including a numerical torque value, e.g., 1 Newton Meter (Nm). In one example, the message may include a positive torque value for steering to a right direction and a negative torque value for steering to a left direction.

Figure 3:
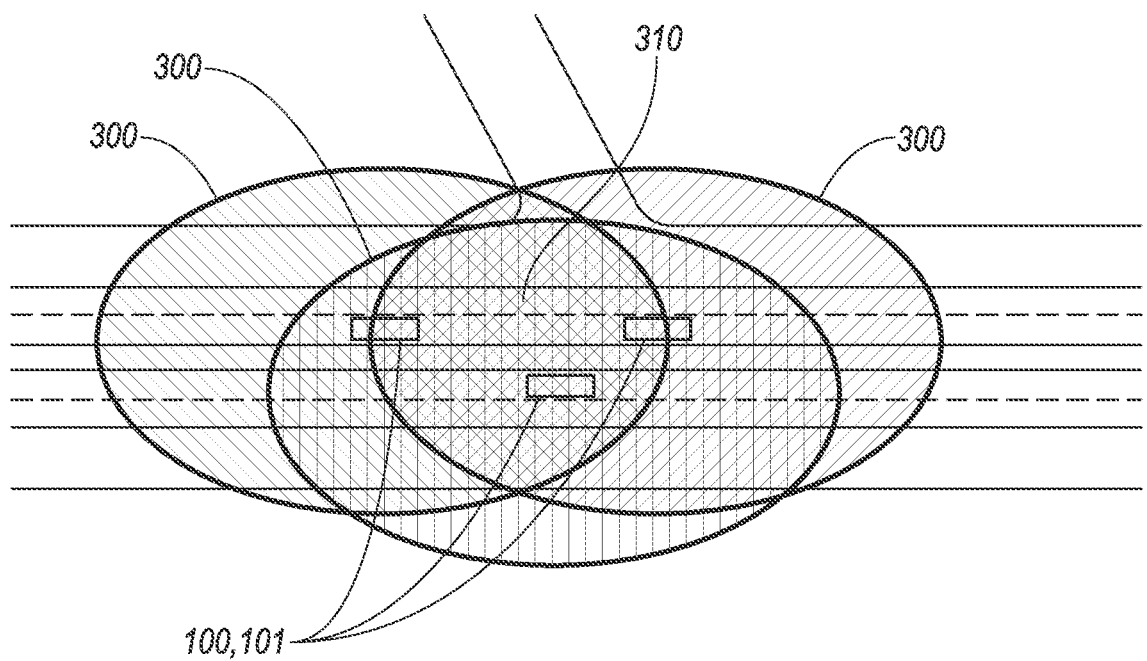
FIG. 3 shows multiple vehicles and fields of view of vehicles object detection sensors.

The sensors 130 may include a variety of devices known to provide data to the computer 110. The sensors 130 may provide data from an area surrounding the vehicle 100, 101. The sensors 130 may include one or more object detection sensors 130 such as light detection and ranging (LIDAR) sensors 130, camera sensors 130, radar sensors 130, etc. An object detection sensor 130, e.g., a LIDAR sensor 130, may include a field of view 300. A field of view 300 of a sensor 130 may be a 3D volume (or area) extending from the sensor 130. For example, as shown in FIG. 3, a field of view 300 of a LIDAR sensor 130 may include a 3D volume including a location of the respective vehicle 100, 101 with a circular or oval-shaped base on the ground surface. A LIDAR sensor 130 typically generates a point cloud representing an environment within a field of view 300 of the LIDAR sensor 130. A point cloud includes 3D coordinates of a plurality of points on surfaces of objects, road, etc., determined based on reflections received from the respective surfaces at the LIDAR sensor 130.

Additionally or alternatively, the sensors 130 may include a Global Positioning System (GPS) sensors 130, visual odometer, etc., which may provide location data including coordinates relative to a global coordinate system 160 with an origin outside the vehicle 100, 101, e.g., a GPS origin point on Earth. The location of a vehicle 100, 101 or other object may be specified by location coordinates (x,y,z) with respect to a three-dimensional (3D) coordinate system 160. The coordinate system 160 may be a Cartesian coordinate system including X, Y, and Z axes, for example. The location coordinate system 160 has an origin point, and coordinates are described with reference to the origin. Location coordinates with respect to a global coordinate system 160, i.e., a coordinate system that covers substantially all of the earth, are herein referred to as "global location coordinates." As shown in FIG. 1, a coordinate system 170 such as a Cartesian coordinate system 170 may be positioned at a reference point 150 of a vehicle 100, 101. For example, a location of a vehicle 100 may be specified with respect to a coordinate system 170 positioned at a second vehicle 101 spaced away from the vehicle 100. In the present context, the location coordinates of a first vehicle 100 with respect to coordinate system 170 positioned in a second vehicle 101 is referred to as relative location coordinates of the first vehicle 100 with reference to the second vehicle 101.

Figure 2:
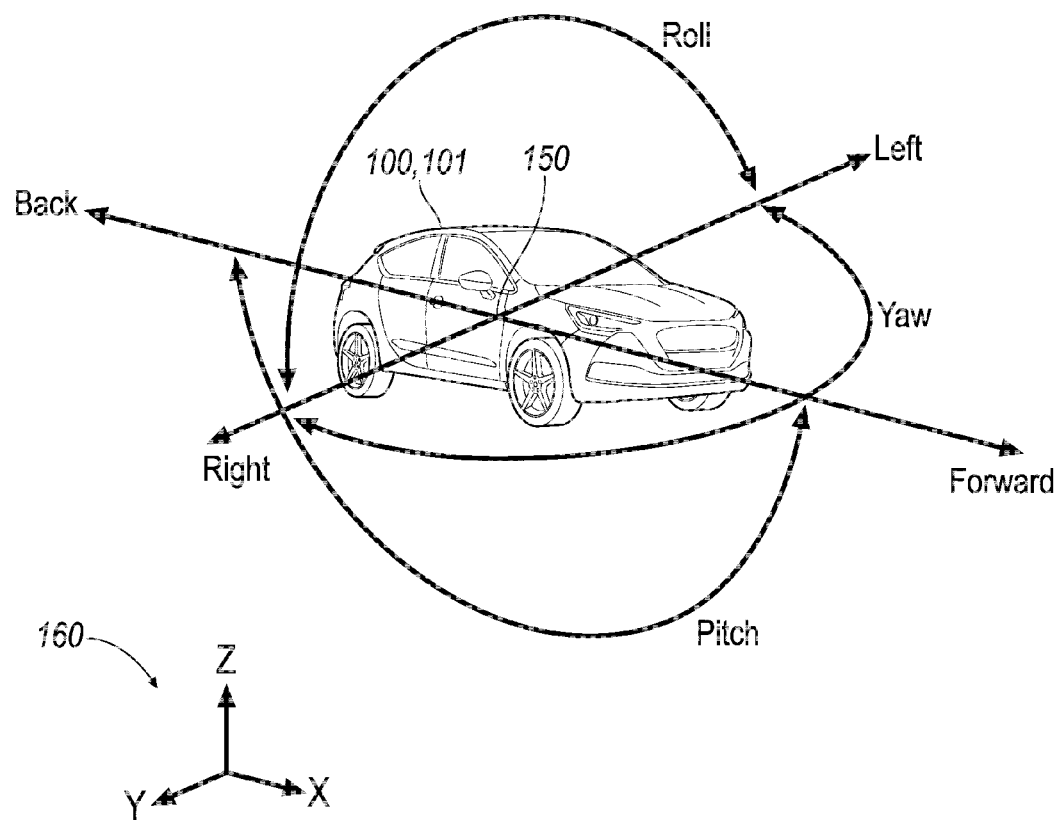
FIG. 2 is a perspective view of the vehicle of FIG. 1 with example orientation vectors superimposed thereon.

With reference to FIGS. 1 and 2, an orientation (also referred to as a pose) of the vehicle 100 is a roll, pitch, and yaw of the vehicle 100. The roll, pitch, and yaw may be specified as angles with respect to a horizontal plane and a vertical axis, e.g., as define by a local coordinate system 170. In the present context, a localization (or six degree of freedom localization) of the vehicle 100 is a set of data defining a location and orientation of the vehicle 100. In the present context, an orientation (or pose) of a vehicle 100 with respect to a global coordinate system 160 having an origin such as the GPS origin is referred to as a "global orientation" of the vehicle 100, whereas an orientation of a first vehicle 100 relative to a coordinate system 160 positioned in a second vehicle 100 is referred to as a "relative orientation" of the first vehicle 100 with reference to the second vehicle 100.

A vehicle 100 computer 110 may be programmed to determine a localization of the vehicle 100 with reference to the global coordinate system 160 based on data received from the vehicle 100 sensors 130. In the present context, the localization determined based on data from the sensors 130 in the vehicle 100 is an "internal localization." For example, the computer 110 may be programmed to determine the location of the vehicle 100 based on data received from the vehicle 100 GPS sensor 130, and/or to determine the vehicle orientation based on data received from vehicle 100 yaw sensor 130, camera sensor 130, and/or visual odometer sensor 130. The computer 110 may be programmed to wirelessly, e.g., via a vehicle-to-vehicle communication network, send the localization data of the vehicle 100 to other vehicle(s) 100 and/or one or more remote computers, e.g., infrastructure computers such as traffic management computers.

The HMI 140 may be configured to receive information from a user, such as a human operator, during operation of the vehicle 100. Moreover, an HMI 140 may be configured to present information to the user. Thus, an HMI 140 may be located in the passenger compartment of the vehicle 100.

With reference to FIG. 3, in one example, the computer 110 in a first vehicle 100 can be programmed to determine an internal localization of the first vehicle 100, including location coordinates and an orientation of the first vehicle 100, based on first vehicle 100 sensor 130 data, and to wirelessly receive localizations of respective second vehicles 100, wherein a first vehicle 100 field of view 300 at least partially overlaps respective fields of view 300 of each of the second vehicles 100. The computer 110 can be programmed to determine pair-wise localizations for respective pairs of the first vehicle 100 and one of the second vehicles 100, wherein each of the pair-wise localizations defines a localization of the first vehicle 100 relative to a global coordinate system 160 based on a (a) relative localization of the first vehicle 100 with reference to the respective second vehicle 100 and (b) a second vehicle localization relative to the global coordinate system 160. The computer 110 can be further programmed to determine an adjusted localization for the first vehicle 100 that has a minimized sum of distances to the pair-wise localizations.

The discussion that follows refers to a first vehicle $AV_x$ and one or more second vehicle(s) $AV_y$, $\{y=1, \ldots, N\}$, N representing total number of second vehicles 101 $AV_y$, in an overlapping area 310 of the fields of view 300 of the first vehicle 100 $AV_x$ and the second vehicles 100 $AV_y$. As discussed above, a vehicle 100 computer 110 may be programmed to determine the vehicle 100 localization with reference to the global coordinate system 160, e.g., based on data received from the vehicle 100 GPS sensor 130, yaw sensor 130, etc. In the present context, the localization of the first vehicle 100 $AV_x$ with reference to the global coordinates 160 includes (i) an orientation $R_{AV_x}^{W}$ of the first vehicle 100 with reference to the world (i.e., the global coordinate system 160) and (ii) a location $t_{AV_x}^{W}$ of the first vehicle 100 $AV_x$ with reference to the global coordinates 160. The computer 110 may be programmed to determine relative localization of the first vehicle 100 $AV_x^y$ relative to a second vehicle 101 $AV_y$ based on data received from the second vehicle 101 $AV_y$.

In the present context, a "pair-wise localization" is a localization of the first vehicle $AV_x$ that is based at least in part on data received from a second vehicle $AV_y$. As discussed below, the computer 110 may be programmed to find a relative location and/or an orientation of the vehicle 100 with respect to a second vehicle 101 by finding a transformation that aligns or minimizes distances between cues obtained from each vehicle 100, 101 $AV_x$, $AV_y$ internal perception. Internal perception is what is observed from the sensors 130 of a vehicle 100, 101. In the present context, a cue is a feature of an environment or a landmark, e.g., distances between landmarks obtained from each vehicle AVx, AVy independently. In the present context, minimizing distance is in the context of minimizing an error between various corresponding landmarks of perceptions of an environment, e.g., point cloud data of the area 310 (FIG. 3).

To compute pair-wise relative locations, each vehicle 100, 101 first perceives the environment with at least one of its perception sensors 130 (e.g., camera, lidar, radar), and then extracts features or a representation of the environment from its own perspective. For example, a LIDAR sensor 130 generates point cloud data representing an environment. In one example, the computer 110 may be programmed to use a representation of the field of view 300 via multiple geometrical primitives (e.g., representing a road intersections with 15 planes) generated based on the point cloud data received from the LIDAR sensor 130. Geometric primitives are basic 3D geometrical shapes, e.g., a plane, a sphere, oval, cube. Note that a plane can be described by its normal vector and a point in the plane, thus including a total of 6 scalar parameters per plane (i.e., 3D location coordinates of the point and 3 vector parameters). Benefits of such representation are that it has a smaller volume of data compared to the point cloud which can beneficially reduce consumption of V2V communication bandwidth. In one example, for extraction of geometrical primitives representing an area, planes may be extracted hierarchically in order of significance (i.e., planes which contain or represents the most points in a point cloud). "Hierarchical" "hierarchically" means data organized in an ordered ranking based on a number of points fitted on a specific plane, with a highest number first (e.g., Plane #1 fits a total of 1000 points, Plane #2 fits a total of 600 points, and so forth), A point is said to fit on a plane if a normal or perpendicular distance from the respective point to the plane does not exceed a predetermined threshold, e.g., 15 centimeters (cm). In one example, a vehicle 100 computer 110 may be programmed to, based on a distribution of points in a LIDAR point cloud, query a subset with most number of points (e.g., a larger surface compared to other surfaces in the field of view 300) that can be represented by the geometrical primitive with small error (e.g., error less than a threshold), to estimate the plane equation, and to remove those points hierarchically. For example, a plane in the 3D overlapping area 310 representing a side wall of a building may have a higher number of points compared to other smaller surfaces within the overlapping area 310. To compute a plane equation, Eigenvalue (or vector decomposition) of a covariance matrix of the subset of extracted LiDAR points may be used. Eigenvector is a vector such that a given matrix minus that number times the identity matrix has zero determinant. The eigenvectors of a matrix of LIDAR points may be used to determine an equation that specifies the plane which includes the respective LIDAR points.

The computer 110 may be programmed to compute a pair-wise localization for the first vehicle 100 by determining a relative localization $\{R_{AV_x}^{AV_y}, t_{AV_x}^{AV_y}\}$ of the first vehicle 100 with respect to each respective second vehicle 100 ($AV_y$), each relative localization including a relative pose $R_{AV_x}^{AV_y}$ and relative location $t_{AV_x}^{AV_y}$ with reference to the respective second vehicle $AV_y$, and to determine the second vehicle 100 localization $\{R_{AV_x}^{AV_y}, t_{AV_x}^{AV_y}\}$ based on data received from a sensor 130 in the second vehicle $AV_y$. The first vehicle 100 computer 110 may be programmed to determine the pair-wise localization $\{(R_{AV_x}^{w})_y, (t_{AV_x}^{w})_y)\}$ of the first vehicle $AV_x$ relative to the global coordinate system 160 based on the second vehicle localization $\{R_{AV_y}^{W}, t_{AV_y}^{W}\}$ and the relative localization of the first vehicle $\{R_{AV_x}^{AV_y}, t_{AV_x}^{AV_y}\}$. The first vehicle $AV_x$ and the second vehicles $AV_y$ have overlapping area 310 of the fields of view 300 and communicate wirelessly via a V2V communication network. The first vehicle $AV_x$ and the second vehicles $AV_y$ are within an overlapped area 310 of the field of view 300 of the vehicles $AV_x$, $AV_y$ and communicate wirelessly via a V2V communication network.

The computer 110 may be programmed to compute each of the pair-wise localizations $\{R_{AV_x}^{AV_y}, t_{AV_x}^{AV_y}\}$ (i.e., for each of y=1, . . . , N) by minimizing distances between representations of the area in an objective function such as Equations (1) and (2), as discussed below. For example, the objective function may be used to perform a parametric optimization aligning and/or minimizing distances between representations of the area within the overlapped area 310. In the present context, "alignment" means that corresponding landmarks, features or cues are in the same position and orientation across two independent views from different vehicles 100, 101. The parameters characterizing alignment here may be rigid body transformations including orientations R and locations t. In one example, to establish alignment, a parametrization of each of the geometric primitives by means of a rotation representing the orientation of the primitive and a center of mass can be used. Since the orientation of the geometric primitive is invariant to its center of mass, an estimation of the registration parameters of rotation denoted by $R \in SO(3)$ and location $t \in \mathbb{R}^3$ as two disjoint optimization problems. Mathematically, such problems can be posed as (1) and (2). SO(3) includes a group of all rotations about the origin of 3D Euclidean space under an operation of composition.

$$\hat{R} = \underset{R \in SO(3)}{\operatorname{argmin}} \left\{ \frac{3}{4} \sum_{k=1}^{M_{AV_x} M_{AV_y}} \|y_k - x(R)\|_{l_2}^2 \right\} \quad (1)$$

$$\hat{t} = \underset{t \in \mathbb{R}^3}{\operatorname{argmin}} \left\{ \Sigma_{i \cap j} n_i^T (R\mu_i^n - \mu_i^a + t) \right\} \quad (2)$$

In (1), the vectors $y_k \in \mathbb{R}^3$ of unit norm (i.e., $\|y_k\|_{l_2}=1$) represent the rotated vector measurements by rotations drawn from a set $\{R_k | k=1, \ldots, M_{AV_x}.M_{AV_y}\}$ of probable rotations $R_k \in SO(3)$. Similarly, the vector function $X(R):SO(3) \rightarrow \mathbb{R}^3$ represents a vector of unit norm rotated by the matrix $R \in SO(3)$. The set of probable rotations consists of rotations $R_k = R_j^{AV_y} R_x^{AV_x^T}$ and $k = M_{AV_y} \cdot (i-1)+j$ where $i \in \{1, 2, \ldots, M_{AV_x}\}$ and $j \in \{1, 2, \ldots, M_{AV_y}\}$ are indices of $AV_x$ and $AV_y$ geometric primitive representations of the perception measurements (e.g., 3D point clouds) with $M_{AV_x}$ and $M_{AV_y}$ describing their total number, respectively. The rotation Matrices $R_j^{AV_y}, R_x^{AV_x^T} \in SO(3)$ represent the orientations from each respective point cloud representations of vehicles 100 by geometric primitives indexed by i, j respectively, and T denotes a matrix transpose. The construction of the set of probable rotations follows from the approximation that for some i, j, then $R_j^{AV_y} \approx RR_i^{AV_x}$. Rotated vectors in Equation (1) may be then be given by $$y_k = \frac{1}{\sqrt{3}} \cdot R_k \cdot I_{3 \times 1} \text{ and } X(R) = \frac{1}{\sqrt{3}} \cdot R \cdot I_{3 \times 1}$$

with each being of unit energy following from the isometry property of rotation matrices. The purpose of Equation (1) is to find the rotation R which minimizes the Euclidean distance between the vector of unit energy rotated by R and a set of rotated by $R_k$ sampled vector measurements each also of unit energy.

Equation (1) can be solved based on Wahba's solution technique or a lazy projections GD algorithm in an online optimization setting. Other techniques for optimizing Equation (1) such as Riemannian manifold are constrained in that the solution is the one of shortest geodesic distance which may not necessarily solve Equation (1).

For Equation (2), an optimal location t may be identified by minimizing the distance along the orthogonal direction between corresponding geometric primitives in the two representations using the estimated R. The orthogonal direction is described by the unit norm vector $n_i \in \mathbb{R}$ where $n_i = R_i^{AV_x}$ (i.e., the column vector corresponding to the normal of the geometric primitive). The vectors $\mu_i^{AV_x}, \mu_{i'}^{AV_y} \in \mathbb{R}^3$ represent a center of mass of corresponding geometric primitives indexed by i, of $AV_x$ and $AV_y$ respectively and is an index of the primitive from the $AV_y$ perspective that corresponds to primitive i from $AV_x$. To optimize for location t in Equation (2), we make use of its convexity property and find the minimum by computing the gradient of the cost in Equation (2) corresponding to translation, and solving for location t when the gradient equals zero. Such process may result in Equation (3).

$$\hat{t} = (\Sigma_{i \cap i'} n n_{i'}^T)^{-1} \Sigma_{i \cap i'} \langle n_i, \mu_i^{AV_x} - R\mu_i^{AV_y} \rangle n_{i'} \quad (3)$$

Here, operators $\langle .,. \rangle$ and $\cap$ denote an inner or dot product and a set intersection, respectively while the subscript −1 is a matrix inverse or a Moore-Penrose pseudoinverse. Summarizing, the optimization of Equations (1) and (2) may find the relative location between pairs $AV_x$ and $AV_y$, which may be referred to as AVx-to-AVy rotation $R_{AV_x}^{AV_y} = \hat{R}$ and location $\hat{t}$. Note that the technique discussed based on Equations (1)-(3) may work without requiring initialization, i.e., compared to other techniques, which may require initialization, this technique uses less computation.

As discussed above, the localization may include location coordinates and/or an orientation of the vehicle 100. Thus, the second vehicle $AV_y$ localization includes a second vehicle $AV_y$ pose (or orientation) $R_{AV_y}^W$ with reference to the global coordinate system 160 and a second vehicle location $t_{AV_y}^W$ with reference to the global coordinate system 160. A computer 110 in the first vehicle $AV_x$ may be programmed to determine a pair-wise orientation $(R_{AV_x}^w)_y$ of the first vehicle $AV_x$ based on the relative pose $R_{AV_x}^{AV_y}$ of the first vehicle and the second vehicle pose $R_{AV_y}^w$.

The computer 110 may be programmed to adjust the localization (i.e., location and/or orientation) of the first vehicle $AV_x$ relative to the global coordinate system 160 based on pair-wise localizations of the first vehicle $AV_x$ and each of the second vehicles $AV_y$. Mathematically, such adjustment introduces a cycle consistency constraint which in turn may result in the samples $y \in \{1, 2, \ldots, N\}$ coming from each second vehicle $AV_y$ in the wireless network as specified with Equations (4a)-(4b). Cycle consistency constraint ensures that the orientation and position transformations across a loop of samples should transform back to zero as one goes through the entire loop and back to the initial orientation and position.

$$(R_{AV_x}^w)_y = R_{AV_y}^w R_{AV_x}^{AV_y} \forall y \quad (4a)$$

$$(t_{AV_x}^w)_y = R_{AV_y}^w t_{AV_x}^{AV_y} + t_{AV_y}^w \forall y \quad (4b)$$

In other words, Equations (4a)-(4b) correspond to samples of the global localization $\{(R_{AV_x}^w)_y, (t_{AV_x}^w)_y\}$ of the first vehicle $AV_x$ from a perspective of each of the second vehicles $AV_y$. These sampled localizations are then used to both validate and adjust the localization of the first vehicle $AV_x$.

The computer 110 may be programmed, based on Equation (5)-(6), to adjust the first vehicle $AV_x$ localization (i.e., the adjusted localization $\{\hat{R}, \hat{t}\}$ of the first vehicle $AV_x$ includes an adjusted first vehicle pose $\hat{R}$ and an adjusted first vehicle location $\hat{t}$) by computing optimal parameters that minimize distances between the internal localization $\{R_{AV_y}^W, t_{AV_y}^W\}$ from $AV_x$ sensors 130 and the pair-wise localization $\{(R_{AV_x}^w)_y, (t_{AV_x}^w)_y\}$ computed based on data received from the second vehicles $AV_y$. In other words, the computer 110 may be programmed to compute the adjusted pose $\hat{R}$ and adjusted location $\hat{t}$ that minimize the sum of distances between $AV_x$ localization $\{R_{AV_y}^W, t_{AV_y}^W\}$ and the pair-wise first vehicle locations $$\{(R_{AV_x}^W)_y, (t_{AV_x}^W)_y\}$$

for all $y \in \{1, 2, \ldots, N\}$, as shown in Equations (5)-(6).

$$\hat{R} = \underset{R \in SO(3)}{\operatorname{argmin}} \left\{ \frac{1}{N} \sum_{y=x, y=1}^{N} \left\| \log(R^T (R_{AV_x}^W)_y) \right\| \right\} \quad (5)$$

$$\hat{t} = \underset{t \in \mathbb{R}^3}{\operatorname{argmin}} \left\{ \sum_{y=x, y=1}^{N} \left\| (t_{AV_x}^W)_y - t \right\|_{l_2} \right\} \quad (6)$$

$$\left\| \log(R^T (R_{AV_x}^W)_y) \right\|$$

is the Riemannian distance with the shortest geodesic between rotations R. Note that the summations in Equations (5) and (6) include an internal localization estimate from the vehicle $AV_x$ denoted by the term indexed as y=x. Finding the parameters that optimally solve Equation (5) may be done using either the $l_2$ average of rotations or the more robust to outliers $l_1$ average computed with Weizfeld algorithm. Solving Equation (6) may be done by computing a location t at which the gradient of its cost is equal to zero which has a closed form solution.

As discussed above, the sensor 130 data from the first vehicle $AV_x$ may be inaccurate. The computer 110 may be programmed to validate the localization data received from the first vehicle 100 sensor 130 to determine whether an adjustment of a localization based on a pair-wise localization of the first vehicle AVx is warranted. For example, the computer 110 may be programmed to determine that an adjustment of the first vehicle $AV_x$ localization is warranted upon determining that a distance between an internal localization $\{R_{AV_y}^W, t_{AV_y}^W\}$ and a consensus of localization $$\{(R_{AV_x}^W)_{consensus}, (t_{AV_x}^W)_{consensus}\}$$

based on the first and second vehicles AVx, AVy satisfies Inequality (7). Thus, when Inequality (7) is satisfied, then an adjustment of the internal localization $\{R_{AV_x}^W, t_{AV_x}^W\}$ is unnecessary.

$$\left\| \log(R_{AV_x}^W, (R_{AV_x}^W)_{consensus}) \right\|_{l_2}^2 + \left\| t_{AV_x}^W - (t_{AV_x}^W)_{consensus} \right\|_{l_2}^2 < \epsilon \quad (7)$$

Threshold parameter $\in$ is a scalar value that sets a threshold between what is consider as being good bad localizations and what needs adjustment. The localization consensus $$\{(R_{AV_x}^W)_{consensus}, (t_{AV_x}^W)_{consensus}\}$$

are computed using Equations (5) and (6), respectively, with a minor change of omitting the term that corresponds to the internal localization $AV_x$. In other words, by removing y=x from the summations of Equations (5) and (6).

Figure 4A:
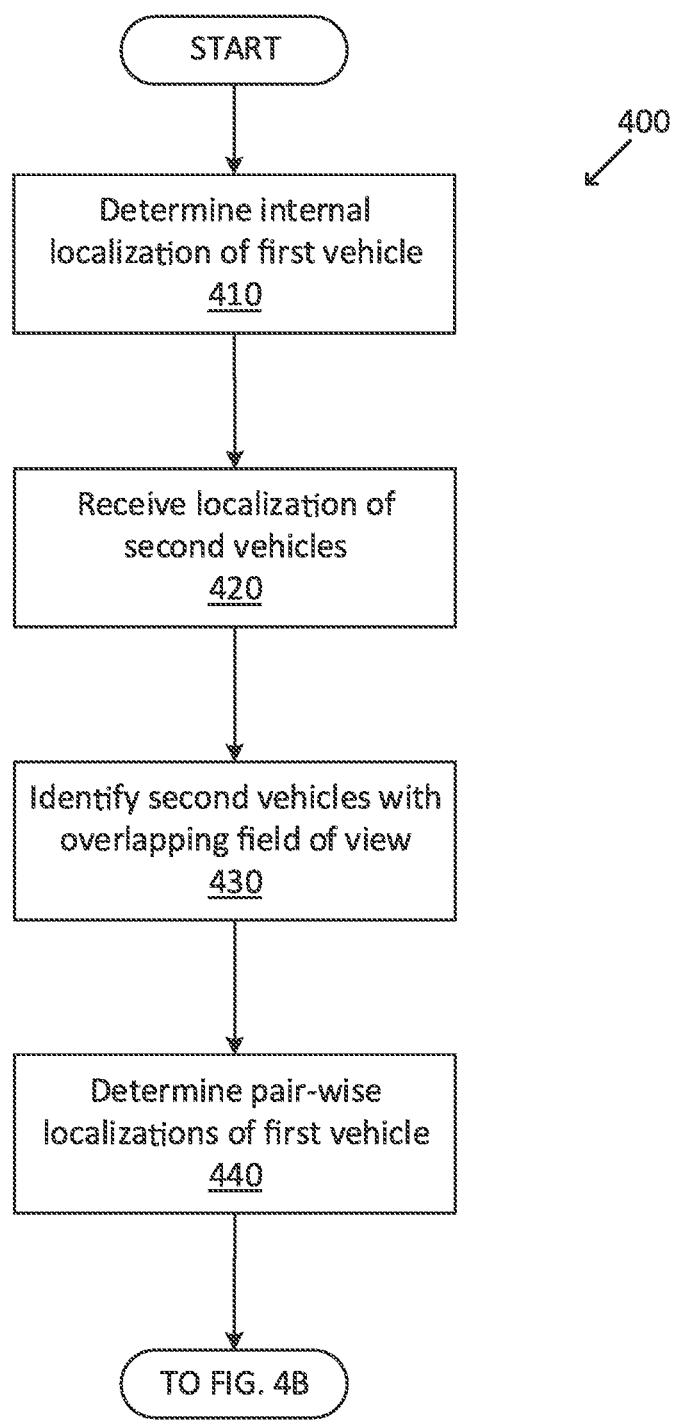
FIGS. 4A-4B show an exemplary block diagram for adjusting vehicle localization and operating the vehicle.
Figure 4B:
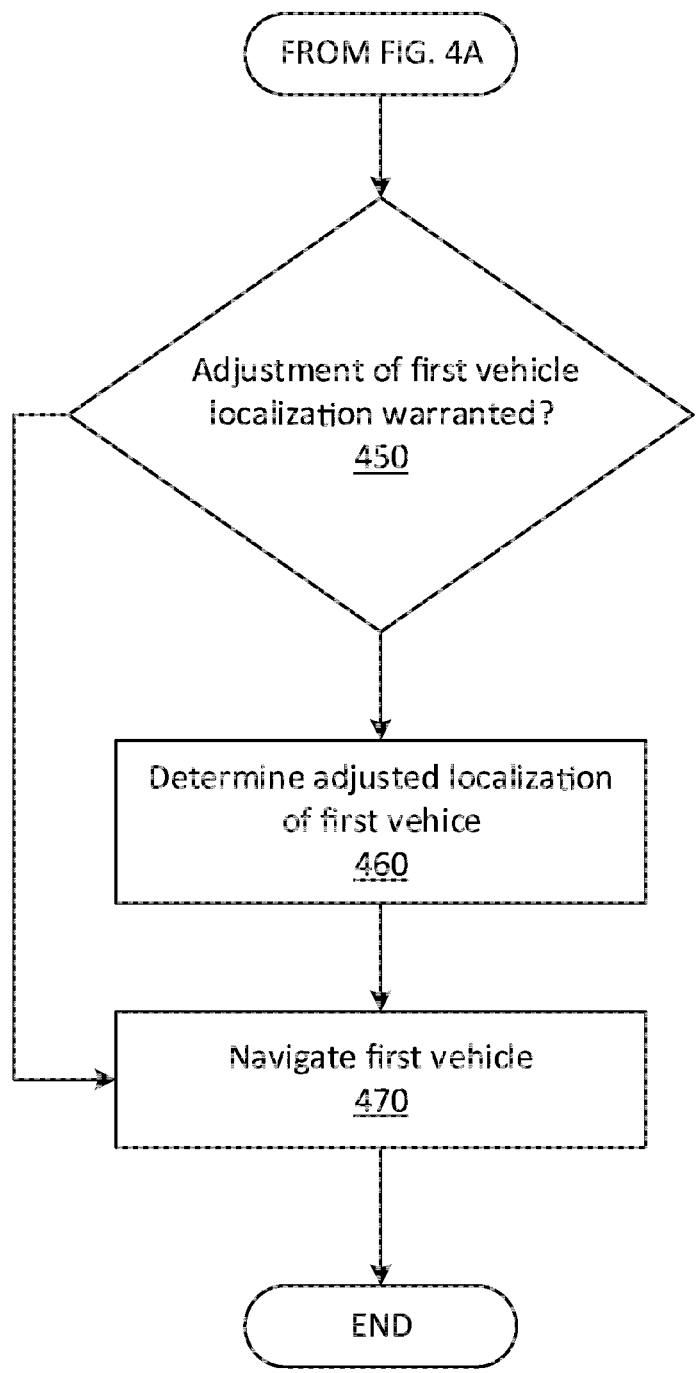

FIGS. 4A-4B show a block diagram of an exemplary process 400 for adjusting vehicle localization and operating a vehicle 100. The computer 110 of a first vehicle 100 may be programmed to execute blocks of the process 400. The first vehicle 100 may be referred to as the first vehicle $AV_x$. Second vehicles 100 may be referred to as second vehicle(s) $AV_y$.

With reference to FIG. 4A, the process 400 begins in a block 410, in which the computer 110 of a first vehicle $AV_x$ determines internal localization $\{R_{AV_y}{}^W, t_{AV_y}{}^W\}$ of the first vehicle $AV_x$ based on data received from the sensor(s) 130, e.g., LIDAR sensor 130, of the first vehicle $AV_x$.

Next, in a block 420, the computer 110 receives second vehicle(s) localization $\{R_{AV_y}{}^W, t_{AV_y}{}^W\}$ via a wireless communication network, e.g., a V2V communication network. The second vehicle localization $\{R_{AV_y}{}^W, t_{AV_y}{}^W\}$ may be determined by a computer 110 in the respective second vehicle $AX_y$ based on data received from sensor(s) 130 in the second vehicle $AX_y$.

Next, in a block 430, the computer 110 determines the second vehicles $AX_y$ within the field of view 300 of the LIDAR sensor 130 of the first vehicle $AV_x$. The computer 110 may be programmed to identify the second vehicles $AX_y$ within an overlapped area 310 of the fields of view 300 of the first and second vehicles $AV_x$, $AV_y$. The computer 110 may determine a N number of second vehicles $AV_y$ which have an overlapping area 310 of the fields of view 300 with the field of view 300 of the first vehicle $AV_x$.

Next, in a block 440, the computer 110 determines a pair-wise localization $$\{(R^W_{AV_x})_y, (t^W_{AV_x})_y\}$$

for each or the second vehicles $AV_y$ for each of y=1, ..., N. The computer 110 may be programmed to determine the pair-wise localizations $$\{(R^W_{AV_x})_y, (t^W_{AV_x})_y\}$$

based on Equations (1)-(3) and (4a)-(4b).

Turning to FIG. 4B, next, in a decision block 450, the computer 110 determine whether an adjustment of the internal localization $\{R_{AV_y}{}^W, t_{AV_y}{}^W\}$ is warranted. The computer 110 may be programmed to determine a consensus of localization $$\{(R^W_{AV_x})_{consensus}, (t^W_{AV_x})_{consensus}\}$$

based on Equations (5)-(6) while omitting the terms corresponding to the first vehicle $AV_x$, as discussed above. The computer 110 may be programmed to determine whether the adjustment of the internal localization $\{_{AV_y}{}^W, t_{AV_y}{}^W\}$ is warranted based on Inequality (7). If the computer 110 determines that an adjustment of the internal localization $\{R_{AV_y}{}^W, t_{AV_y}{}^W\}$ is warranted, then the process 400 proceeds to a block 460; otherwise the process 400 proceeds to a block 470.

In the block 460, the computer 110 determines an adjusted localization $\{\hat{R}, \hat{t}\}$ for the first vehicle $AV_x$ based on the internal localization $\{R_{AV_x}{}^W, t_{AV_x}{}^W\}$ and the pair-wise localizations $$\{(R^W_{AV_x})_y, (t^W_{AV_x})_y\},$$

e.g., based on Equations (5)-(6).

In the block 470, which can be reached from either the decision block 450 or the block 460, the computer 110 navigates the vehicle 100 based at least in part on the localization of the first vehicle $AV_x$. If the block 470 is reached from the decision block 450, then the computer 110 operates the first vehicle $AV_x$ based on the internal localization (i.e., non-adjusted localization). If the block 470 is reached from the block 460, then the computer 110 operates the first vehicle $AV_x$ based on the adjusted localization $\{\hat{R}, \hat{t}\}$ of the first vehicle $AV_x$. Following the block 470, the process 400 ends, or returns to the block 410 although not shown in FIGS. 4A-4B.

Unless indicated explicitly to the contrary, "based on" means "based at least in part on" and/or "based entirely on."

Computing devices as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random-access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random-access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH, an EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A computer comprising a processor and a memory, the memory storing instructions executable by the processor to:
   determine a localization of a first vehicle, including location coordinates and an orientation of the first vehicle, based on first vehicle sensor data;
   wirelessly receive localizations of respective second vehicles, wherein a first vehicle field of view at least partially overlaps respective fields of view of each of the second vehicles;
   determine pair-wise localizations for respective pairs of the first vehicle and one of the second vehicles, wherein each of the pair-wise localizations defines a localization of the first vehicle relative to a global coordinate system based on a (a) relative localization of the first vehicle with reference to the respective second vehicle and (b) a second vehicle localization relative to the global coordinate system;
   determine an adjusted localization for the first vehicle that has a minimized sum of distances to the pair-wise localizations; and
   operate the vehicle according to the adjusted localization.

2. The computer of claim 1, wherein the sensor data is from one or more of a GPS sensor, LIDAR sensor, camera sensor, or visual odometer.

3. The computer of claim 1, wherein the second vehicles include respective second computers, each programmed to determine the localization of the second vehicle based on data received from one or more sensors in the respective second vehicle.

4. The computer of claim 1, wherein the instructions further include instructions to compute each of the one or more pair-wise localization for the first vehicle by:
   determining a relative localization of the first vehicle with respect to each respective second vehicle, each relative localization including a relative pose and relative location coordinates with reference to the respective second vehicle based on data received wirelessly from a second vehicle computer;
   determining the second vehicle localization based on data received from a sensor in the respective second vehicle; and
   determining the pair-wise localization of the first vehicle relative to the global coordinate system based on the second vehicle localization and the relative localization of the first vehicle.

5. The computer of claim 4, wherein the second vehicle localization includes a second vehicle pose with reference to the global coordinate system and a second vehicle location with reference to the global coordinate system.

6. The computer of claim 5, wherein the instructions further include instructions to determine a pair-wise pose of the first vehicle based on the relative pose of the first vehicle and the second vehicle pose.

7. The computer of claim 1, wherein the instructions further include instructions to compute each of the pair-wise localizations by minimizing distances between representations of the area in an objective function.

8. The computer of claim 7, wherein the area is a 3D area including overlapping portion of the fields of view of the first vehicle and the second vehicles.

9. The computer of claim 1, wherein the adjusted localization of the first vehicle includes an adjusted first vehicle pose and an adjusted first vehicle pose, and the instructions further include instructions to:
   determine the adjusted first vehicle location by minimizing distances between the pair-wise first vehicle locations; and
   determine the adjusted first vehicle pose by minimizing distances between the pair-wise first vehicle poses.

10. A method, comprising:
    determining a localization of a first vehicle, including location coordinates and an orientation of the first vehicle, based on first vehicle sensor data;
    wirelessly receiving localizations of respective second vehicles, wherein a first vehicle field of view at least partially overlaps respective fields of view of each of the second vehicles;
    determining pair-wise localizations for respective pairs of the first vehicle and one of the second vehicles, wherein each of the pair-wise localizations defines a localization of the first vehicle relative to a global coordinate system based on a (a) relative localization of the first vehicle with reference to the respective second vehicle and (b) a second vehicle localization relative to the global coordinate system;
    determining an adjusted localization for the first vehicle that has a minimized sum of distances to the pair-wise localizations; and
    operating the vehicle according to the adjusted localization.

11. The method of claim 10, wherein the sensor data is from one or more of a GPS sensor, LIDAR sensor, camera sensor, or visual odometer.

12. The method of claim 10, further comprising determining, in a second computer in each of the second vehicles, the localization of the second vehicle based on data received from one or more sensors in the respective second vehicle.

13. The method of claim 10, wherein computing each of the one or more pair-wise localization for the first vehicle further includes:
    determining a relative localization of the first vehicle with respect to each respective second vehicle, each relative localization including a relative pose and relative location coordinates with reference to the respective second vehicle based on data received wirelessly from a second vehicle computer;
    determining the second vehicle localization based on data received from a sensor in the respective second vehicle; and determining the pair-wise localization of the first vehicle relative to the global coordinate system based on the second vehicle localization and the relative localization of the first vehicle.

14. The method of claim 13, wherein the second vehicle localization includes a second vehicle pose with reference to the global coordinate system and a second vehicle location with reference to the global coordinate system.

15. The method of claim 14, further comprising determining a pair-wise pose of the first vehicle based on the relative pose of the first vehicle and the second vehicle pose.

16. The method of claim 10, further comprising computing each of the pair-wise localizations by minimizing distances between representations of the area in an objective function.

17. The method of claim 16, wherein the area is a 3D area including overlapping portion of the fields of view of the first vehicle and the second vehicles.

18. The method of claim 10, further comprising determining an adjusted first vehicle location by minimizing distances between the pair-wise first vehicle locations, wherein the adjusted localization of the first vehicle includes the adjusted first vehicle pose and an adjusted first vehicle pose; and determining the adjusted first vehicle pose by minimizing distances between the pair-wise first vehicle poses.

* * * * *